Dec. 31, 1935.　　　　G. CAMILLI　　　　2,026,375
TEMPERATURE INDICATOR
Filed May 27, 1935
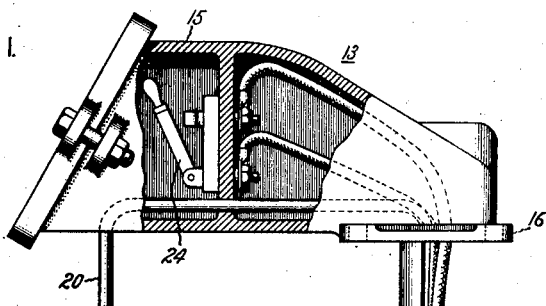
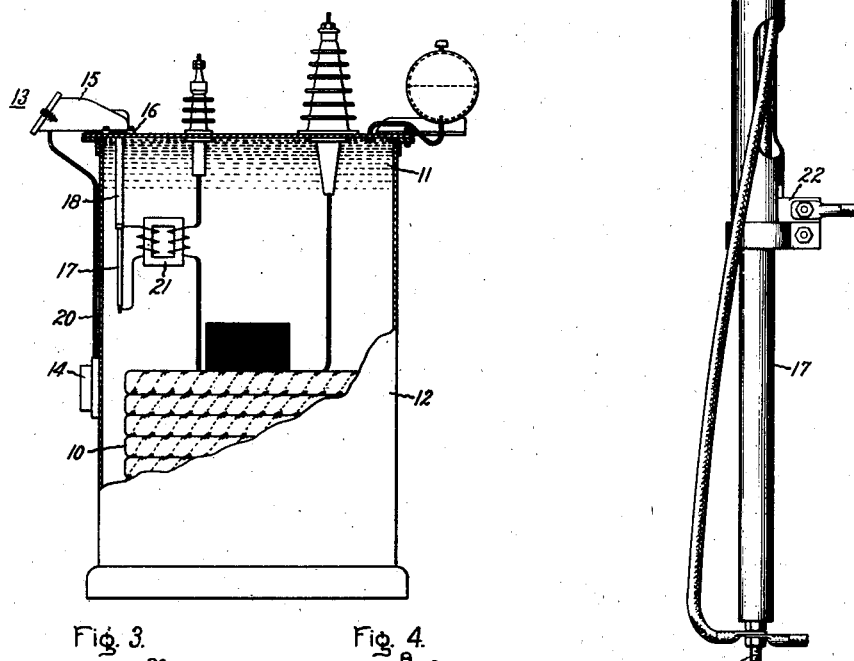
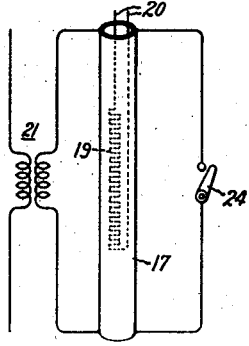
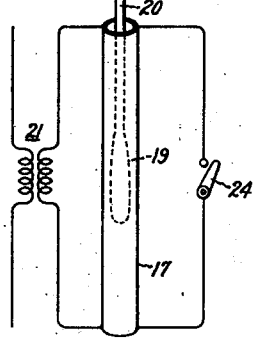
Inventor:
Guglielmo Camilli,
by Harry E. Dunham
His Attorney Patented Dec. 31, 1935

2,026,375

UNITED STATES PATENT OFFICE 2,026,375

TEMPERATURE INDICATOR

Guglielmo Camilli, Pittsfield, Mass., assignor to General Electric Company, a corporation of New York Application May 27, 1935, Serial No. 23,600

3 Claims. (Cl. 73—52)

My invention relates to temperature indicators for liquid-immersed electrical apparatus such as transformers and reactors. The temperature of the internal parts of a transformer or reactor increases as its load or current is increased and the maximum safe load or current is limited by the maximum safe internal temperature. It is therefore often desirable to be able to determine quickly and conveniently the temperature of the hottest part of the apparatus. When the apparatus is not in operation, it will of course assume the same temperature as that of the surrounding air. When the apparatus is in operation, however, its electrical and magnetic losses appear as heat and its temperature rises. In apparatus of the liquid-immersed type the heat is absorbed from the apparatus by the surrounding liquid which carries it to the casing containing the apparatus where it is dissipated. The internal temperature of the apparatus is of course higher than that of the surrounding liquid except when no load is being carried and the difference between the temperatures of the liquid and the apparatus is approximately a function of the load or current carried by the apparatus.

The general object of the invention, therefore, is to provide an improved temperature indicator arranged to respond to the temperature of the liquid and to the effect of the current carried by the apparatus to indicate the internal temperature of the apparatus.

The invention will be better understood from the following description taken in connection with the accompanying drawing in which Fig. 1 is a view partly in section of a temperature indicator constructed in accordance with the invention; Fig. 2 is a view of a liquid-immersed transformer provided with the temperature indicator shown in Fig. 1; and Figs. 3 and 4 are explanatory, diagrammatic views. Like reference characters indicate similar parts in the different figures of the drawing.

The transformer 10 shown in Fig. 2 is immersed in a body of insulating liquid 11 in a metal casing 12. A temperature indicator 13, shown more in detail in Fig. 1, is mounted on the cover of the casing 11 and connected to a temperature indicating instrument 14 mounted on the wall of the casing 12. The temperature indicator 13 includes a switch casing 15 having a base 16 bolted to the cover of the transformer casing 12. A resistance tube 17 is suspended in the insulating liquid 11 by a support 18 depending from the base 16 of the switch casing. A temperature responsive element 19 is disposed within the resistance tube 17 and is therefore thermally close to the tube 17 so that its temperature will always follow that of the tube. The temperature responsive element 19 is connected through the support 18 and the switch casing 15 to the indicating instrument 14 by a suitable connection 20. The temperature responsive element 19 may be of any suitable type which will control the indicating instrument 14 and cause it to indicate the temperature of the resistance tube 17. As indicated in Fig. 4 the temperature responsive element 19 is the usual form of thermometer bulb connected by a capillary tube 20 to the indicating instrument 14. As indicated in Fig. 3, the temperature responsive element 19 is a resistor of the type which changes in its resistance in response to changes in its temperature. This resistor 19 is connected by conductors 20 to the indicating instrument 14 which is of course arranged to indicate the temperature corresponding to the resistance of the resistor 19.

The primary winding of a current transformer 21 is connected in series with one of the leads of the main transformer 10 and the secondary winding of this current transformer 21 is connected to the terminals 22 and 23 of the resistance tube 17. The terminals 22 and 23 of the tube 17 are also connected to a switch 24 in the switch casing 15. The temperature responsive element 19 is closely surrounded by the resistance tube so that it will always have the same temperature and will always cause this temperature to be indicated by the indicating instrument 14. If there is no load on the transformer, then the transformer and the liquid 11 surrounding it will be at the same temperature and the temperature responsive element will respond to this temperature and cause it to be indicated by the instrument 14. If the transformer is carrying a load, then there will be a current in the primary winding of the current transformer 21 and this will induce a corresponding current in the secondary winding of the current transformer 21 and in the resistance tube 17. The current in the tube 17 is always proportional to the current in the winding 10 of the transformer and the resistance of the resistance tube 17 is so selected and proportioned that the temperature of the tube 17 will always correspond to that of the internal parts of the winding of the main transformer 10. The resistance tube 17 is preferably formed of some suitable non-magnetic material such as stainless steel so that its temperature will not be affected by induction from the adjacent apparatus. This resistance tube 17 closely surrounds the temperature responsive element 19 and thus affords good mechanical protection for the temperature responsive element.

It is sometimes desirable to know the temperature of the liquid 11 as well as the internal temperature of the transformer 10. If the switch 24 is closed, it completes a short circuit across the resistance tube 17 so that any current from the current transformer 21 will flow through the switch rather than through the resistance tube. With this switch 24 closed, therefore, the instrument 14 will indicate the temperature of the liquid 11 even though a load is being carried by the main transformer 10.

The invention has been explained by describing and illustrating a particular form and application of the invention but it will be apparent that changes may be made without departing from the spirit of the invention and the scope of the appended claims.

What I claim as new and desire to secure by Letters Patent of the United States is:

1. The combination with electrical apparatus immersed in an insulating liquid, of a temperature indicator including a resistance immersed in said liquid and connected to carry a current proportional to that in said apparatus, a temperature responsive element thermally close to said resistance, a temperature indicating instrument connected to said temperature responsive element, and a switch connected to short circuit said resistance.

2. The combination with electrical apparatus immersed in an insulating liquid within a casing, of a temperature indicator including a resistance immersed in said liquid and connected to carry a current proportional to that in said apparatus, a temperature responsive element thermally close to said resistance, a switch casing mounted on said apparatus casing, a temperature indicating instrument connected through said switch casing to said temperature responsive element, and a switch in said switch casing connected to short circuit said resistance.

3. The combination with electrical apparatus immersed in an insulating liquid, of a temperature indicator including a resistance tube immersed in said liquid and connected to carry a current proportional to that in said apparatus, a temperature responsive element within said resistance tube and spaced therefrom, a temperature indicating instrument connected to said temperature responsive element, and a switch connected to short circuit said resistance tube.

GUGLIELMO CAMILLI.